No. 723,316.  PATENTED MAR. 24, 1903.
G. E. RUMRILL.
TIRE FASTENER.
APPLICATION FILED SEPT. 4, 1902.
NO MODEL.
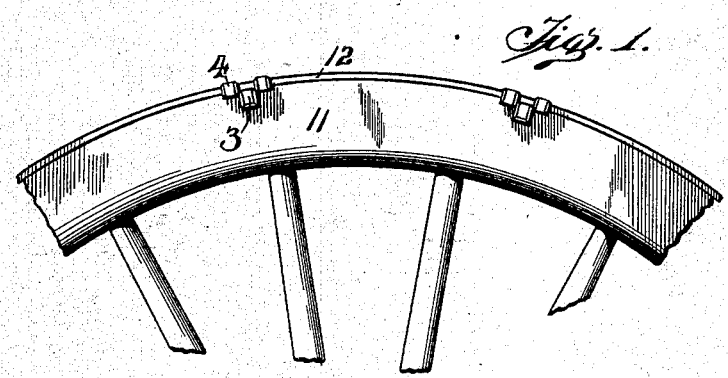
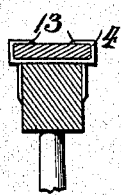
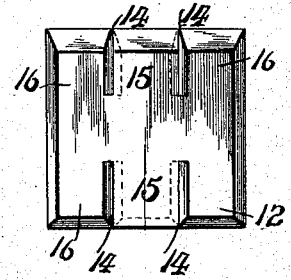
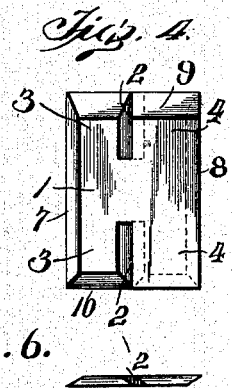
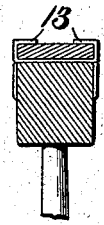
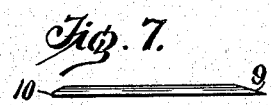
Witnesses
L. G. Handy
Ruth J. Mitchell
Inventor
George Edward Rumrill
By Mason Fenwick Lawrence
his Attorneys

UNITED STATES PATENT OFFICE.

GEORGE EDWARD RUMRILL, OF CARROLLTON, ILLINOIS.

TIRE-FASTENER.

SPECIFICATION forming part of Letters Patent No. 723,316, dated March 24, 1903.

Application filed September 4, 1902. Serial No. 122,096. (No model.)

*To all whom it may concern:*

Be it known that I, GEORGE EDWARD RUMRILL, a citizen of the United States, residing at Carrollton, in the county of Greene and State of Illinois, have invented certain new and useful Improvements in Tire-Fasteners; and I do hereby declare the following to be a full, clear, and exact description of the invention, such as will enable others skilled in the art to which it appertains to make and use the same.

This invention relates to improvements in tire-fasteners, and especially to that class of tire-fasteners which is adapted also to clench the felly of a wheel.

It consists of a metallic piece notched or cut to a suitable depth upon its opposite edges and beveled, so that it may be driven between the tire of a wheel and the felly, the projecting ends being then turned over or clenched upon the tire and felly.

It also consists in certain other novel constructions, combinations, and arrangements of parts, as will be hereinafter fully described and claimed.

In the accompanying drawings, Figure 1 is a side elevation of a portion of a wheel, showing my improved tire-fastener and clench applied thereto. Fig. 2 is a cross-section through the tire and felly of a wheel, showing a fastener and clench in position thereon, the tire in this instance being wider than the felly. Fig. 3 is a similar view, but showing the fastener and clench secured to a wheel in which the tire and felly are of the same width. Fig. 4 is a top plan view of a fastener having four clenching projections. Fig. 5 is a similar view of the fastener provided with six clenching projections. Fig. 6 is an edge view of one of the said fingers, showing the manner of making the cuts in the edge thereof. Fig. 7 is an edge view of the finger, showing an uncut edge and illustrating the bevels at the ends thereof.

My improved tire-fastener and felly-clench 1 is preferably formed of a thin metallic plate, which is made with one or more slits or cuts 2 upon the opposite edges thereof, the cuts extending, preferably, a third of the way across the plate, as clearly illustrated in Figs. 4 and 5 of the drawings. A simple and convenient manner of making these cuts is to form them by cutting in any suitable manner a narrow slit obliquely to the face of the plate of the fastener. In this manner the projecting clenching ends 3 and 4, which are thus formed, are provided with beveled edges extending in the direction necessary for correspondence with the bevels of the outer edges of the plate. The outer edges of the plate are also beveled at a corresponding angle, as at 7 and 8, while the end edges 9 and 10 are also beveled. One end edge, as 9, is provided with a much longer bevel than the other edge, as 10, the edge 10 being beveled for only half of its width, as clearly illustrated in Fig. 7. The edge 10 is thus provided with an edge portion which is thick enough to permit of the plate being driven by means of a hammer between the tire and felly of a wheel without injuring the said edge of the plate. If the edge 10 were made as sharp as the edge 9, the pounding or driving of the plate would bend and injure the same, as can be readily seen. My improved tire-fastener will thus be seen to be a tire-tightener also, since it is driven between the tire and the felly and would necessarily take up any slack that exists in the tire.

In applying the fastener for holding a tire in position the sharp long edge 9 of the plate is inserted between the tire and the felly, and the plate is driven by any suitable implement, as a hammer, between the said tire and felly. When the clenching ends 3 and 4 extend equally upon each side of the tire, one set of clenching projections, as 3, is turned downwardly by means of a hammer or other tool along the sides of the felly 11 of a wheel, and the other clenching projections 4 are turned upwardly in the same manner upon the edges of the tire 12. The clenching ends 4 preferably bend outwardly and also around the outer face of the tire to some extent, as shown at 13 in Figs. 2 and 3 of the drawings. The fastener and tire-tightener can thus be applied by the use of an ordinary driving-tool, as a hammer, this being ample for forcing the fastener between the tire and the felly and for turning downwardly and upwardly the clenching ends or projections of the said plate. Of course it will be necessary to hold a piece of metal or other heavy material against the clenching projections or the felly of the wheel upon one side when turning downwardly or upwardly the clenching projections upon the other side. An ax or other heavy implement of a similar character will do very well for this purpose, it only being necessary to have something against which to hammer the fastener in clenching its ends or projections.

The plate may be provided with only one clenching portion at each end, if preferred, as shown in Fig. 4, though it can, of course, be provided with any number of clenching-projections. As shown in Fig. 5, the plate may be formed with two cuts, as 14, on each end edge of the plate, forming three clenching-fingers for the opposite sides of the wheel. In this instance when the plate is inserted between the tire and felly the central clenching projections 15 may be turned downwardly against the sides of the felly 11, while the outer clenching projections 16 are turned around the edges of the tire 12. Of course it will be apparent that the plate may be provided with any number of clenching projections, all within the spirit of the present invention.

A clench or tire-fastener like that described as my invention is adaptable to wheels having various widths of tires. This will be readily understood by reference to Figs. 2 and 3 in the drawings, the fastener being applied to a wheel in Fig. 2 in which the tire is wider than the felly, while in Fig. 3 the tire and the felly are of the same width. The operation of placing the fastener or tire-tightener in position is the same in either case, and the formation of said tightener enables it to accommodate either a wide or a narrow tire, as the case may be.

It will be evident that one or more of such plates and tire-tighteners may be applied to a wheel at one or more points thereon and that the device is extremely simple in structure and easy of application and yet forms a firm fastener for the tire upon the felly of a wheel and a sure and easy means of tightening such tire in position.

Having thus fully described my invention, what I claim as new, and desire to secure by Letters Patent, is—

1. A tire fastener and tightener comprising a wedge-plate formed with oppositely-arranged and oppositely-beveled kerfs or cuts in its end edges making clenching projections which may be turned over against the felly and tire of a wheel, substantially as described.

2. A tire tightener and fastener, comprising a wedge-plate formed with inclined cuts in the opposite edges thereof, the said cuts forming clenching projections which have a plurality of beveled edges, which projections may be turned around the sides of the felly of the wheel and around the edges of the wheel-tire, substantially as described.

3. A tire-fastener comprising a wedge-plate formed with a comparatively long and sharp beveled edge at one end and a partially-beveled edge at the other end to facilitate the plate being driven between the tire and felly of the wheel, the said beveled edges of the plate being provided with kerfs or cuts forming projecting fingers or clenching portions which may be turned around the edges of the wheel felly and tire, substantially as described.

4. A tire tightener and fastener, comprising a plate having a series of beveled kerfs in its opposite edges extending about one-third of the way through the plate and forming a series of clenching-fingers which may be turned around the edges of the tire and felly of a wheel when driven between the parts, each of said fingers having a plurality of beveled edges, substantially as described.

In testimony whereof I hereunto affix my signature in presence of two witnesses.

GEORGE EDWARD RUMRILL.

Witnesses:
   CHAS. FISCHER,
   TOM G. WILLIAMS.